United States Patent [19]

Simatovich

[11] 4,196,944
[45] Apr. 8, 1980

[54] BUSHING INSERT AND GUIDE POST SLEEVE FOR DIE SET

[76] Inventor: Stephen E. Simatovich, 403 W. State Rd. #130, Valparaiso, Ind. 46383

[21] Appl. No.: 874,070

[22] Filed: Feb. 1, 1978

[51] Int. Cl.² ............................................. F16C 19/00
[52] U.S. Cl. ..................................... 308/4 C; 308/6 R
[58] Field of Search .................................... 308/4 C, 6

[56] References Cited
U.S. PATENT DOCUMENTS

| 2,774,430 | 12/1956 | Blazek | 308/4 C |
| 3,434,760 | 3/1969 | Wendler | 308/4 C |
| 4,003,283 | 1/1977 | Janiszewski | 308/4 C |

*Primary Examiner*—Douglas C. Butler

*Attorney, Agent, or Firm*—Woodard, Weikart, Emhardt & Naughton

[57] ABSTRACT

A die set which includes upper and lower die shoes including guide posts fixed to the upper die shoe and bushings fixed to the lower die shoe. A sleeve is mounted on the guide posts by removable fasteners. A sleeve bearing including ball bearings and a bearing retainer cage are mounted on the guide post sleeves. Inserts are provided in the bushings and are secured by removable fasteners for readily removing the inserts. The ball bearings run inside the inserts during die operation. When replacement is needed due to wear, the guide post sleeves are removed and replaced, and the inserts are removed and replaced, without disturbing the guide posts themselves or the bushings. Oilers and seals and hardened set screws are used to contribute to prolonged life.

36 Claims, 8 Drawing Figures

BUSHING INSERT AND GUIDE POST SLEEVE FOR DIE SET

BACKGROUND OF THE INVENTION

1. Field of the Invention

This invention relates generally to die sets for use in presses, and more particularly to guide posts and bushings for die sets.

2. Description of the Prior Art

Prior art die sets typically include an upper and lower die shoe. One or the other of the die shoes has a set of posts (usually four) affixed to it, and the die shoe has a set of bushings affixed to it. The bushings are received on the posts and serve to guide the shoes as they are brought together during press operation for the forming or punching of a part. It is essential that accuracy be maintained in guiding the die shoes, so that the mating parts of the dies secured thereto cooperate as intended. Otherwise early damage and destruction of the dies, and possibly also the press itself, may result.

After extended periods of use, guide posts and bushings of die sets become worn. As the wear increases, the possibility of misalignment of the die parts increases with the attendant possibility of damage to the dies themselves. Therefore it becomes necessary to repair or replace the posts or bushings. This usually requires removal from the die shoes, with the result that the die set is inoperative for whatever period is required in this procedure. Then, upon replacement of the posts and bushings, considerable time is required to again provide perfect alignment of the dies mounted in the die shoes.

Prior art patents noted in the course of a search for the subject invention are as follows:

U.S. Pat. No. 2,177,958—Link
U.S. Pat. No. 2,316,468—Thomas
U.S. Pat. No. 2,420,296—Bishop et al.
U.S. Pat. No. 2,774,430—Blazek
U.S. Pat. No. 3,092,425—Conner
U.S. Pat. No. 3,273,944—Hammon
U.S. Pat. No. 3,353,876—Moyer Of these patents, the Conner, Moyer, and Blazek patents disclose anti-friction bearings in die sets. The Hammon patent shows a die set having aluminum oxide bearing surfaces. The Link, Thomas and Bishop patents show replaceable sleeves. None of these references shows post bearing sleeves and bushing inserts which are readily removable without disturbing the posts or bushings for replacements in die sets.

SUMMARY OF THE INVENTION

Described briefly, in a typical embodiment of the present invention, a die set is provided with guide posts and bushings in opposite die shoes, and readily removable and replaceable inserts in the bushings, and readily removable and replaceable sleeves on the posts, and anti-friction bearing means operating between the sleeves and inserts during the normal operation of the die set in a press. Sleeve and bearing guide means are provided as well as lubricating and sealing means.

DESCRIPTION OF THE PREFERRED EMBODIMENT

Figure 1:
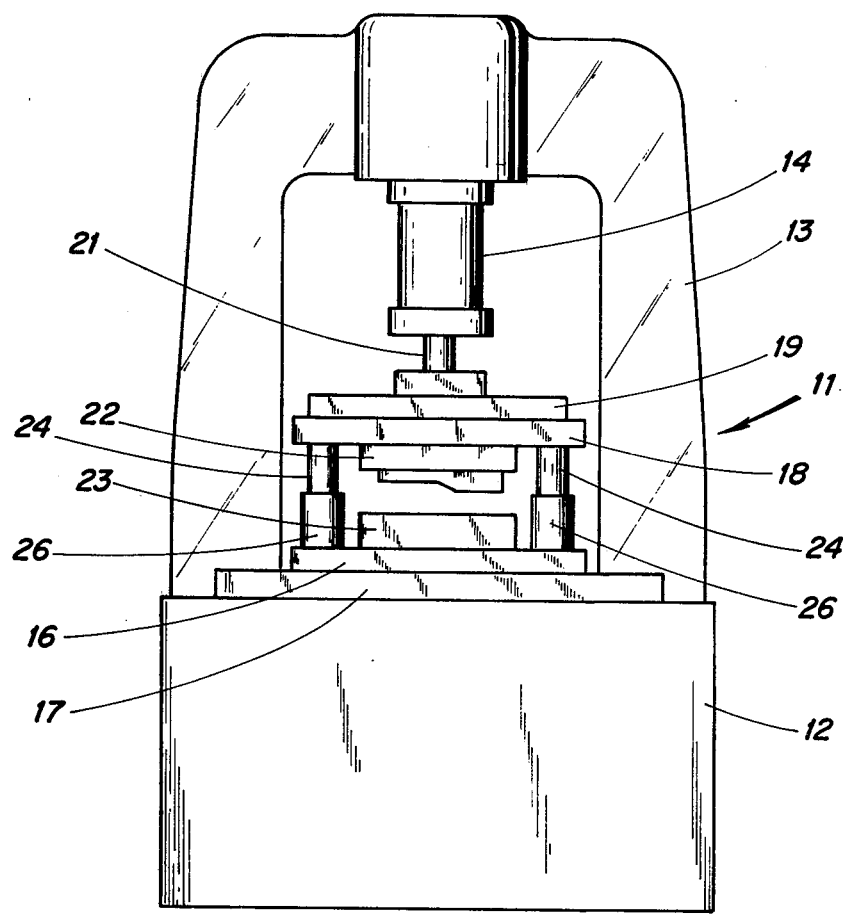
FIG. 1 is a front elevational view of a punch press having a die set therein according to a typical embodiment of the present invention.

Referring now to the drawings, FIG. 1 shows schematically a punch press 11 having a bed 12 and C-frame 13 mounting a hydraulic cylinder 14 thereon. The invention is equally applicable to other types of presses.

A lower die shoe 16 is mounted to a bolster 17 and an upper die shoe 18 may be mounted to the ram 19 which is connected to the piston rod 21 which is driven upwardly and downwardly by the hydraulic cylinder 14. The upper die or punch 22 is mounted to the upper die shoe 18 and the lower die 23 is mounted to the lower die shoe 16. Two upper guide post and sleeve assemblies 24 are shown mounted to the upper die shoe, and two sleeve bushing and insert assemblies 26 are mounted to the lower die shoe 16. Typically there are two additional upper and lower post and sleeve assemblies and sleeve bushing and insert assemblies mounted to the upper and lower die shoes according to a typical embodiment of the present invention. They would be mounted directly behind the ones which are shown in FIG. 1.

Figure 2:
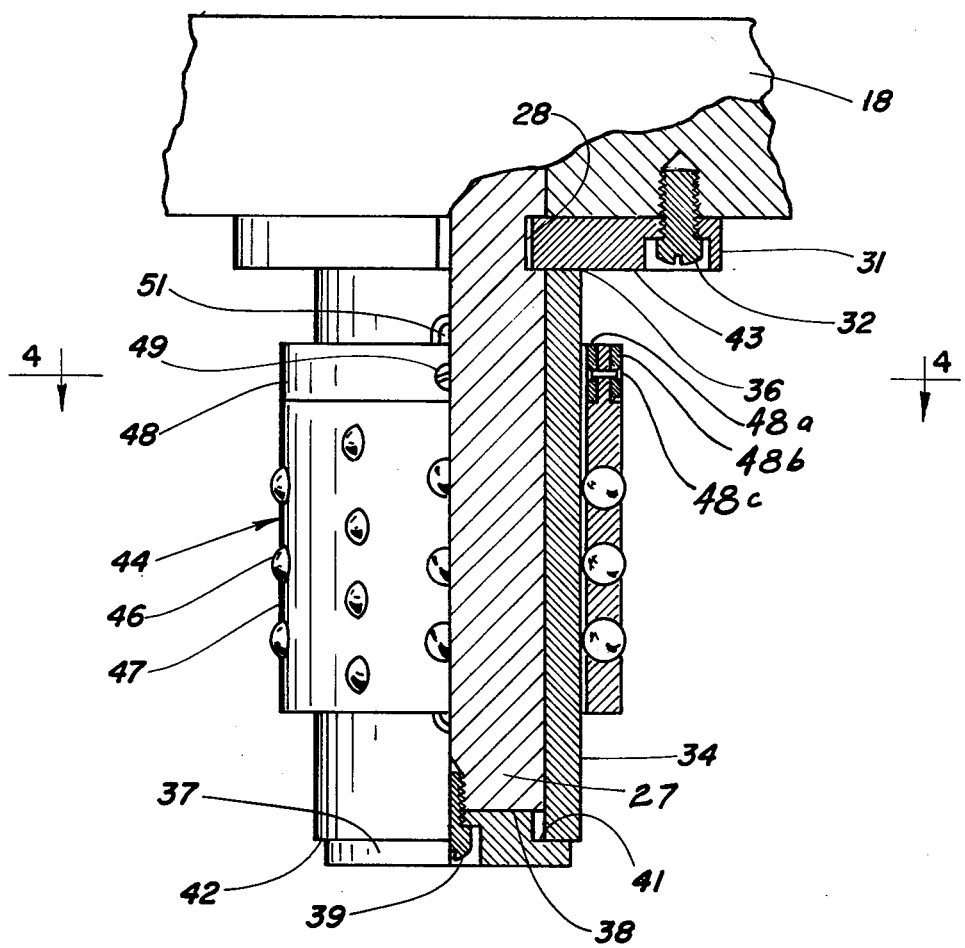
FIG. 2 is a front elevational view, partially in section, showing the guide post, guide post sleeve, and bearing assembly mounted to the upper die shoe according to a typical embodiment of the present invention.
Figure 3:
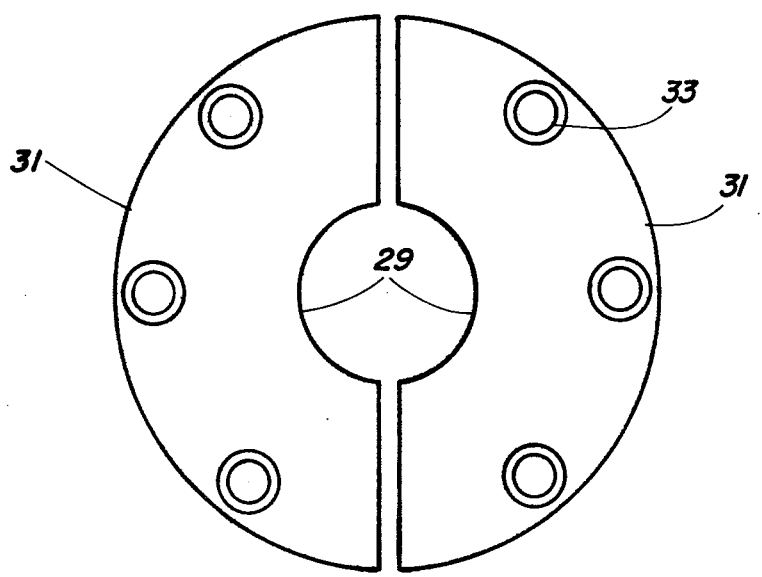
FIG. 3 is a top plan view of a split holding ring employed in the assembly of FIG. 2.

Referring now to FIG. 2, guide post 27 is press fitted into the die shoe 18. It has an external circumferential groove 28 which receives the internal circular edge portion 29 of a split holding ring 31 which is bolted to the die shoe 18 by bolts or machine screws 32 circularly spaced in the apertures 33 in the split holding ring. Actually the split holding ring is comprised of two identical semicircular pieces as best shown in FIG. 3.

A guide post sleeve 34 is received on the post 27. The fit of the sleeve on the post is a "slip fit" with the clearance between the outer cylindrical surface of the post and the inner cylindrical surface of the sleeve being between 0.000025 inches and 0.0002 inches on the diameter. The upper end of the sleeve abuttingly engages the lower face of the ring 31 at 36. A holding cap 37 is secured to the lower end 38 of the post 27 by means of a machine screw 39 threaded into the lower end of the post. The shoulder 41 of the cap abuts the lower end 42 of the sleeve 34 and secures it in position with the upper end of it abutting the lower face 43 of the holding ring 31. Accordingly the sleeve is longitudinally fixed to the post.

Figure 4:
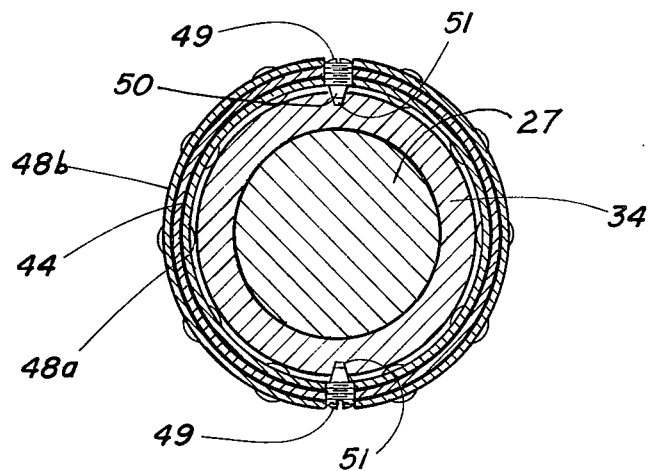
FIG. 4 is a section taken at line 4—4 in FIG. 2 and viewed in the direction of the arrows, and showing the shape of the groove of the guide post and in the guide post sleeve, and the set screw in the bearing cage and received in the groove in the guide post sleeve.

An anti-friction bearing assembly 44 is mounted to the sleeve 34. This particular form of anti-friction bearing assembly includes a plurality of circularly and longitudinally spaced ball bearings 46 confined in a bearing cage 47 which is cylindrical and encircles the sleeve with appropriate space between the sleeve and the bearing cage to avoid contact between them. As shown in FIG. 2 and also in FIG. 4, a steel collar 48 comprising inner and outer collar rings 48a and 48b, respectively, is riveted by circularly spaced rivets 48c to the top of the bearing cage and receives therein a set screw 49. The set screw is threaded into the collar and has a somewhat tapered point received in a longitudinally extending groove 51 in the guide post sleeve. The walls of the groove converge (fifteen degrees on each side as shown in FIG. 4) toward the central axis of the sleeve, and the nose 50 of the set screw has a conical taper of the same angle on it. This set screw is thereby fittingly received in the groove as the screw is threaded through the collar. The screw nose is hardened and the walls of the groove in the sleeve are hardened and ground and polished to permit relative longitudinal movement between the bearing cage and the sleeve with good control of prevention of relative rotational movement between them, and long life of the groove and the set screw. There is no relative longitudinal movement between the guide post and the guide post sleeve.

Figure 5:
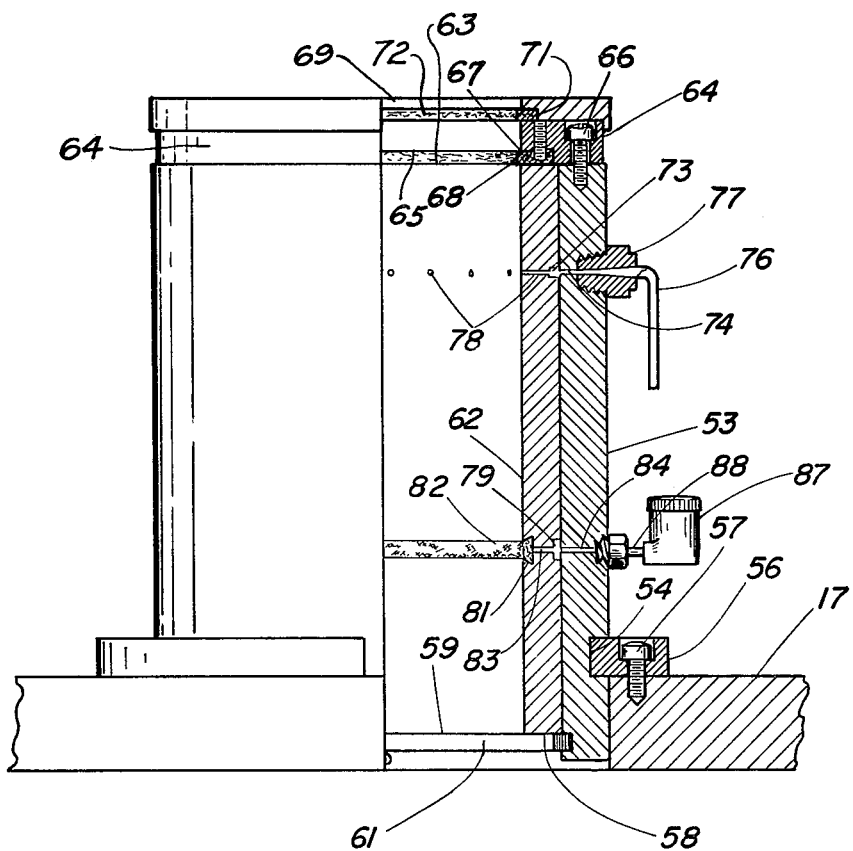
FIG. 5 is an elevational view, partially in section, showing the sleeve bushing and bushing insert mounted in the lower die shoe.

Referring now to FIG. 5, a sleeve bushing 53 is press fitted into the lower die shoe 17. The bushing also has an outwardly facing circumferential groove 54 in the outer cylindrical surface thereof which receives a split collar 56 similar to the above mentioned split holding ring 31. In this instance the collar is secured to the lower die shoe by a set of circularly spaced machine screws 57.

Figure 5A:
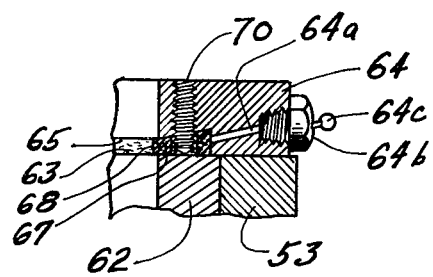
FIG. 5a is an enlarged fragmentary section showing the foreign particle control and lubrication detail for the bushing insert.

The lower end 58 of the sleeve bushing insert 62 of the present invention abuttingly engages the upper face 59 of a snap ring 61 in a groove in the inner wall of bushing 53. The snap ring thereby supports the lower end of the sleeve bushing insert 62 of the present invention. The upper end of 63 of the insert is abuttingly engaged by the hold-down cap 64 which is secured to the sleeve bushing by means of a series of circularly spaced machine screws 66 threaded into the bushing. An inwardly facing groove 67 is provided between the upper end 63 of the insert and the circular notch 65 formed in the underside of the hold-down cap 64 and receives packing material having an inwardly facing edge 68 suitable to cooperate with the bearing retainer 44 of the guide post and sleeve assembly when the die set is assembled as in FIG. 1, to seal out foreign matter. Circularly spaced setscrews 70 threaded into cap 64 and received through holes in the packing ring can be used to urge the bushing insert against the snap ring 61. As shown in FIG. 5a, the packing may have wicking properties and receive lubricant through passageway 64a in the cap from fitting 64b supplied by oil tube 64c. An alternative or supplemental construction is to provide a dust cover 69 having a circular groove 71 in the underside thereof and packing 72 disposed between that groove and the upper face of the hold-down cap 64.

For lubrication of the die set, outwardly facing circumferential groove 73 is provided in the outer cylindrical surface of the insert 62 (FIG. 5) and serves as an oil gallery. This is supplied through a passageway 74 in the sleeve bushing 53 which cooperates with a lubricant supply through the tube 76 secured to the bushing by the fitting 77 threadedly received in the bushing. A plurality of circularly spaced radial passages 78 is provided in the insert for conduction of lubricant from the gallery 73 to the inner cylindrical surface of the insert.

Additional lubricating means, which may be used as a supplement or alternate to that described immediately above, includes an outwardly facing circumferential groove 79 in the outer cylindrical surface of the insert. There is also an inwardly facing circumferential groove 81 having a wick 82 received therein. A plurality of circularly spaced radial passageways 83 provide communication between the gallery 79 and the wick 82 to lubricate the wick. A supply for the gallery may be provided through passageway 84 from a snap-lever or other type of oiler 87 connected to the fitting 88.

As described above regarding the relationship between the guide post sleeve and guide post, the sleeve bushing insert is a slip fit with respect to the sleeve bushing, there being a clearance between the outer cylindrical surface of the sleeve of the insert and the inner cylindrical surface of the bushing of from 0.000025 to 0.0002 inches.

Figure 6:
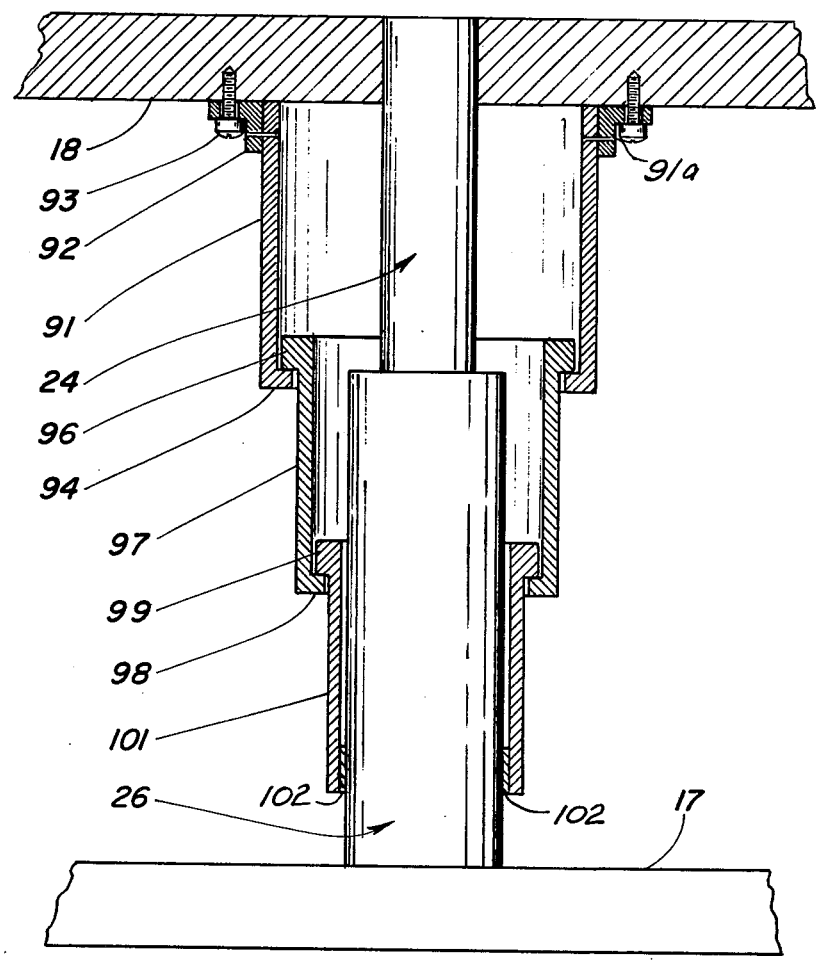
FIG. 6 is a view showing the post and sleeve bushing assembly in a die set, with a shield assembly, shown in section, mounted to the upper die shoe.

Referring now to FIG. 6, there is shown a telescopic shield assembly which includes a first telescoping shield 91 which is riveted by circularly spaced rivets as at 91a to a flange 92 bolted to the upper die shoe 18 by a plurality of circularly spaced cap screws 93. The shield 91 has an inwardly directed lower flange 94 which supports an outwardly projecting upper flange 96 of a second shield 97 which has an inwardly directed lower flange 98 supporting an outwardly projecting upper flange 99 of the thrid shield 101. These three shields cooperate to exclude foreign matter from the die set guide assembly and yet are collapsible as the assembly closes during a die closing operation. A band 102 of steel or other suitably heavy material is riveted to the bottom of lower shield 101 to be sure there is sufficient weight at that location to assure reliable descent of the shield as the die shoes 17 and 18 separate during opening of the die.

Figure 7:
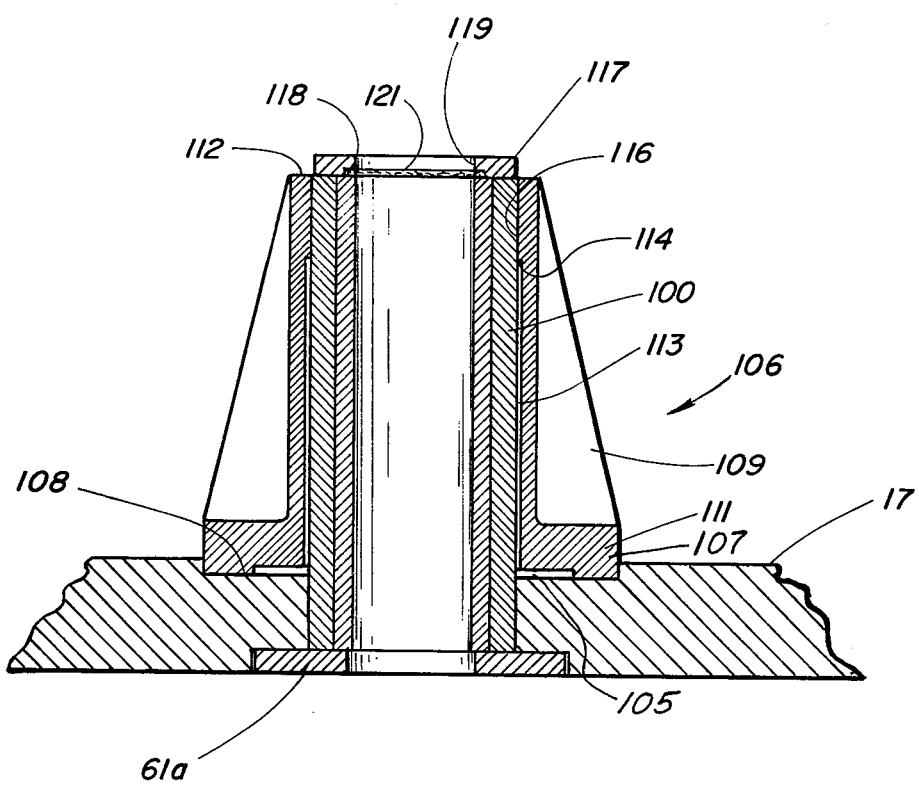
FIG. 7 is a sectional view showing a different mounting and support for the sleeve bushing.

Referring now to FIG. 7, there is shown a modification of the sleeve bushing and insert assembly. In this particular embodiment, the bushing 100 is press fitted into the die shoe 17. The bushing insert is supported at the bottom by the plate 61a secured in the die shoe 17 by a circularly spaced set of cap screws (not shown). However, in this instance, the upper end of the bushing is laterally supported by means of the support housing 106 which is bolted to the die shoe 17 by means of a series of circularly spaced bolts (not shown) extending through the lower flange 107 of the support outboard of counterbore 105 therein, the lower flange being received in a counterbore 108 in the upper face of the lower die shoe. A plurality of circularly spaced buttresses or ribs 109 is provided between the upper face of the flange 111 and the upper end of 112 of the support housing. A radial clearance or relief area is provided at 113 between the housing and the bushing, and the upper end of the bushing has a shoulder 114 projecting inwardly to the point of abutment of the upper inner cylindrical surface 116 of the housing with the outer cylindrical surface of the bushing 100. A hold-down cap 117 is secured to the upper end of the bushing by a series of circularly spaced bolts (not shown) and has an inwardly facing groove 118 at the inner cylindrical surface 119 thereof receiving packing 121 for the same purpose as described above with reference to FIG. 5.

It should be noted with reference to both FIGS. 5 and 7, that the hold-down caps or collars 64 and 69 in FIG. 5 and 117 in FIG. 7 can be split units similar to the split construction of the holding ring 31 of FIG. 3. This will enable removal and replacement of the packing, if desired, without complete separation of the upper and lower guide assembly.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. In a first die member for use in a press, the die member having at least one guide post for guiding relation to a cooperating die member in a press, the improvement comprising:
   a guide post sleeve mounted to the post; and
   a bearing sleeve mounted on said guide post sleeve and linearly movable along said sleeve,
   said guide post sleeve being removable from said guide post when said post is fixed in said first die member, without removing said post from said first die member.

2. The improvement of claim 1 wherein:
   said guide post has a first end fixed in said die member; and
   guide post sleeve retaining means are mounted on an opposite end of said guide post and engage said guide post sleeve and retain said guide post sleeve on said post.

3. The improvement of claim 2 wherein said retaining means include:
   a cap secured to said guide post opposite end and confining said sleeve between said cap and said die member.

4. The improvement of claim 3 wherein said retaining means further include:
   threaded removable fastener means affixing said cap to said guide post opposite end.

5. The improvement of claim 3 wherein:
   said guide post is press fitted into said die member.

6. The improvement of claim 5 wherein:
   said guide post sleeve is slip fitted onto said guide post.

7. The improvement of claim 1 wherein:
   said guide post has a first end fixed in said die member, and;
   guide post retaining means are mounted on said first die member and retain said guide post in position on said first die member.

8. The improvement of claim 7 wherein:
   said guide post has a circumferential external groove thereon adjacent said first die member; and
   said retaining means include split collar means having a portion received in said groove, and threaded removable fastener securing said split collar means to said first die member.

9. The improvement of claim 8 wherein said split collar means include:
   at least two semicircular collar shells, each having a face abuttingly engaging said first die member, and each having an inwardly extending portion received in a portion of said external groove of said guide post sleeve, one end of said guide post sleeve abuttingly engaging a face of each of said shells and longitudinally located thereby.

10. The improvement of claim 9 and further comprising:
    a bearing sleeve;
    anti-friction bearing means in said bearing sleeve and rollable on said guide post sleeve.

11. The improvement of claim 10 wherein:
    said anti-friction bearing means include a plurality of bearing balls spaced in and caged by said bearing sleeve.

12. The improvement of claim 11 wherein:
    there is zero clearance between said balls and said guide post sleeve.

13. The improvement of claim 12 wherein:
    said bearing sleeve is cylindrical, and
    said balls project radially outward from the outer cylindrical surface of said bearing sleeve to rollingly receive a guide means of a cooperating guide member.

14. The improvement of claim 10 and further comprising:
    a longitudinally extending groove in the exterior of said guide post sleeve; and
    a set screw threadedly received in said bearing sleeve and fitting precisely in said groove to prevent rotational movement between said bearing sleeve and said guide post sleeve.

15. The improvement of claim 9 wherein:
    said guide post sleeve and said guide post have a diametrical clearance between their respective facing inner and outer surfaces of between 0.000025 inches and 0.0002 inches.

16. The improvement of claim 1 wherein:
    said guide post sleeve has a longitudinally extending groove in the exterior thereof;
    anti-friction bearing means are mounted on said guide post sleeve and are rollable longitudinally on said guide post sleeve, said bearing means including a bearing sleeve having a longitudinal axis colinear with the longitudinal axes of said guide post and guide post sleeve;
    a set screw is threadedly received in said bearing sleeve and has a portion guidingly received in said longitudinally extending groove to accommodate relative linear movement between said bearing sleeve and said guide post sleeve and prevent relative rotation between said bearing sleeve and said guide post sleeve.

17. The improvement of claim 16 wherein:
    said longitudinally extending groove has a pair of straight side walls which converge toward the said longitudinal axes and are hardened, ground and polished; and
    said set screw has a nose which is hardened and ground and fittingly received in said groove for close sliding fit in said groove as said bearing sleeve moves longitudinally relative to said guide post sleeve.

18. In a die member for use in a press, the improvement comprising:
    a sleeve bushing secured in said die member;
    a sleeve bushing insert fittingly received and secured in said bushing; and removable from said bushing without removing said sleeve bushing from said die member.

19. The improvement of claim 18 wherein:
    said sleeve bushing includes an external circumferential groove therein;
    and sleeve bushing retainer means are received in said groove and secured to said die member to secure said sleeve bushing in said die member.

20. The improvement of claim 19 wherein:

said retainer means include a split retainer secured to said die member by readily removable threaded fasteners.

21. The improvement of claim 20 and further comprising:
second retainer means secured to said die member and abuttingly engaging an end of said bushing disposed in said die member.

22. The improvement of claim 18 and further comprising:
an insert retainer secured to said sleeve bushing and abuttingly engageable with said insert to retain said insert in said sleeve bushing.

23. The improvement of claim 22 wherein:
said sleeve bushing and said bushing insert have a diametrical clearance between their respective facing inner and outer cylindrical surfaces of between 0.000025 inches and 0.0002 inches.

24. The improvement of claim 23 and further comprising:
packing means confined by said hold down cap;
said cap having an inner circular edge of substantially the same diameter as an inner cylindrical surface of said insert;
said packing means having a circular inwardly facing surface exposed at said inner edge of said cap to exclude foreign matter from the said inner cylindrical surface of said insert.

25. The improvement of claim 24 and further comprising:
a lubricator mounted on said holddown cap and communicating with said packing means for lubrication thereof, and including a fitting mounted on said cap, and a passageway in said cap from said fitting to said packing means.

26. The improvement of claim 22 wherein:
said insert retainer is a hold down cap mounted on and secured to the end of said sleeve bushing by readily removable threaded fasteners.

27. The improvement of claim 22 wherein:
said insert retainer includes a snap ring residing in an inner circumferential groove in said sleeve bushing.

28. The improvement of claim 27 wherein:
one end of said insert abuttingly engages said snap ring.

29. The improvement of claim 18 and further comprising;
lubricating means including an external circumferential groove in an outer cylindrical surface of said insert;
lubricant feeding means secured to said sleeve bushing;
said bushing having passageway means therein in registry with said groove and communicating from said feed means to said groove to supply lubricant to said groove;
said insert having lubricant transmitting means at an inner cylindrical surface of said insert.

30. The improvement of claim 29 wherein:
said transmitting means include circularly spaced radially extending holes having opposite ends opening into said external groove and said inner cylindrical surface to feed lubricant from said groove to said inner cylindrical surface.

31. The improvement of claim 29 wherein:
said transmitting means include an inwardly facing inner circumferential groove in said inner cylindrical surface of said insert and having a wick therein, and at least one passageway from said external groove to said inner groove to transmit lubricant to said wick.

32. In a die set for presses, the die set having upper and lower die shoes, and guide post and bushing means for guiding relative movement between said die shoes, the improvement comprising:
a guide post secured to one of said die shoes and having a guide post sleeve mounted thereto to provide a guide bearing surface around said guide post;
a guide sleeve bushing mounted to the other of said die shoes and having a sleeve bushing insert received therein to provide a bearing surface inside said bushing;
said guide post sleeve and said insert being removable from the die set without moving said post relative to said one die shoe and said bushing sleeve relative to the other die shoe.

33. The improvement of claim 32 wherein:
anti-friction bearing sleeve means engage an outer cylindrical surface of said guide post sleeve and an inner cylindrical surface of said insert, with zero clearance between bearings of said bearing means and said surfaces to precisely guide relative movement between said upper and lower die shoes along colinear axes of said guide post sleeve and said insert.

34. The improvement of claim 33 and further comprising:
telescoping shield means connected to said upper die shoes and surrounding said guide post sleeve and said sleeve bushing to exclude foreign matter.

35. The improvement of claim 34 wherein said telescoping shield means includes:
a first cylindrical portion having an outwardly extending upper end flange bolted to said upper die shoe, and an internal flange at its lower end;
a second cylindrical portion having an outwardly extending upper end flange supported on said internal flange of said first portion, and having an internal flange at its lower end; and
a third cylindrical portion having an outwardly extending upper end flange supported on said internal flange of said second portion, and having a lower end opening closely surrounding said sleeve bushing adjacent said lower die shoe.

36. The improvement of claim 33 wherein:
said sleeve bushing is press fitted into said lower die shoe; and
a bushing support is bolted to said lower die shoe, said support having a lower end flange fittingly received in a counterbore in the upper face of said lower die shoe, and said support having bushing engaging and supporting surfaces at its upper end at the upper end of said sleeve bushing.

* * * * *